July 21, 1942.  W. H. THORNTON  2,290,605
LOCK-WASHER TESTING MACHINE
Filed March 18, 1940  3 Sheets-Sheet 2
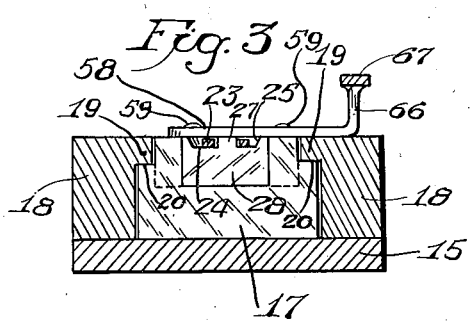
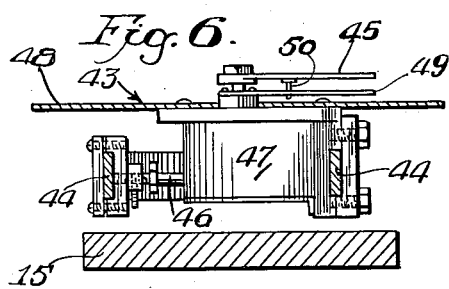
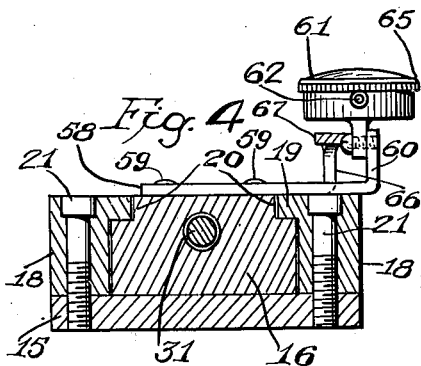
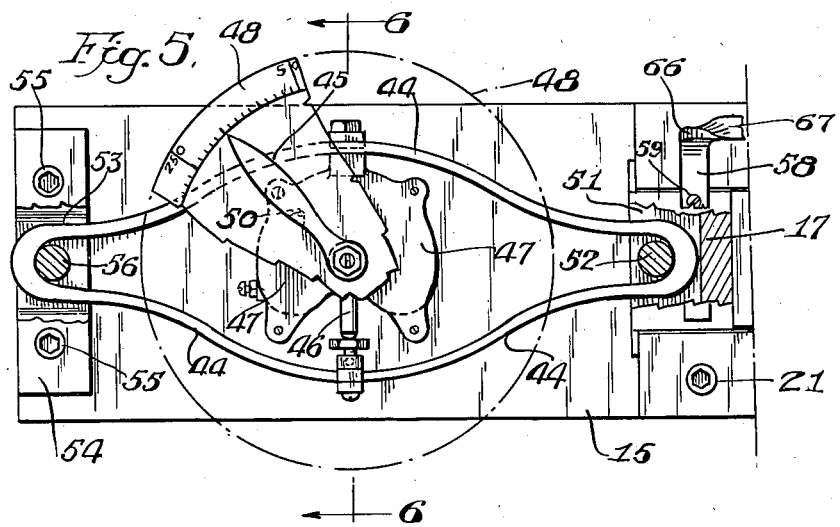
INVENTOR.
William H. Thornton
BY Leonard L. Kalish
ATTORNEY.

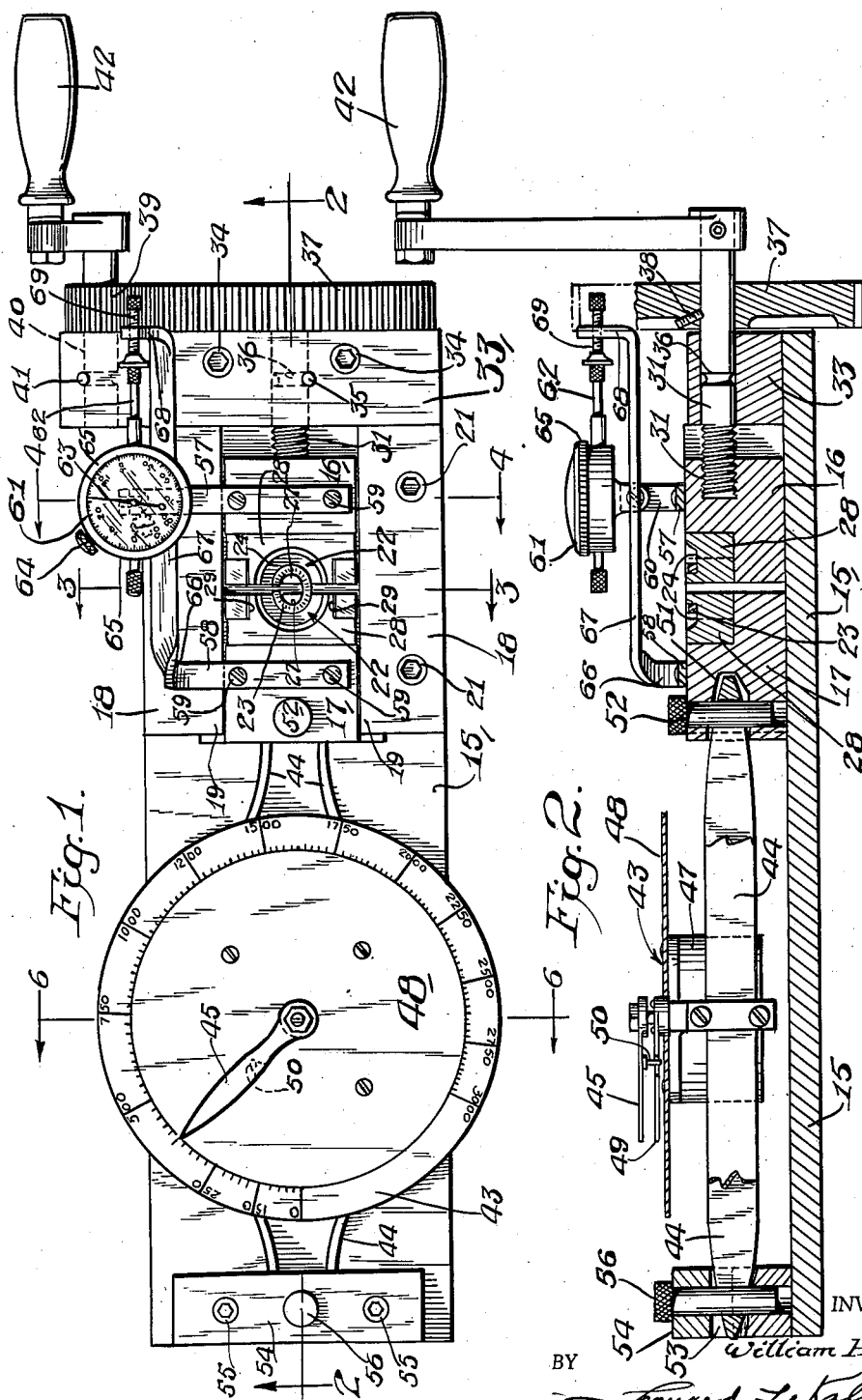

July 21, 1942. W. H. THORNTON 2,290,605
LOCK-WASHER TESTING MACHINE
Filed March 18, 1940 3 Sheets-Sheet 3
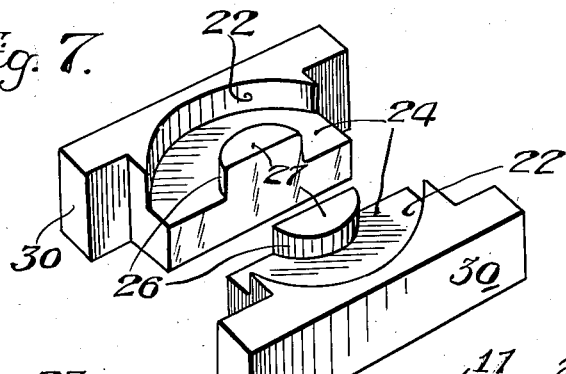
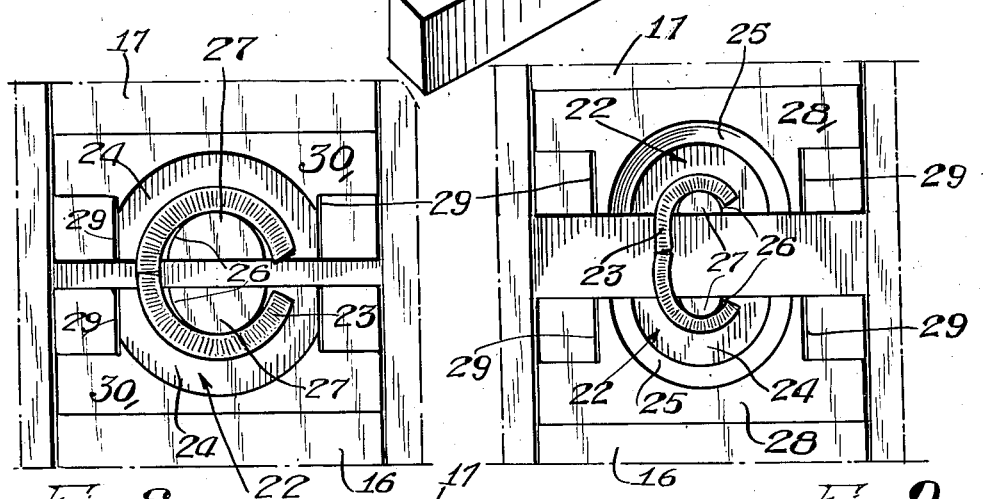
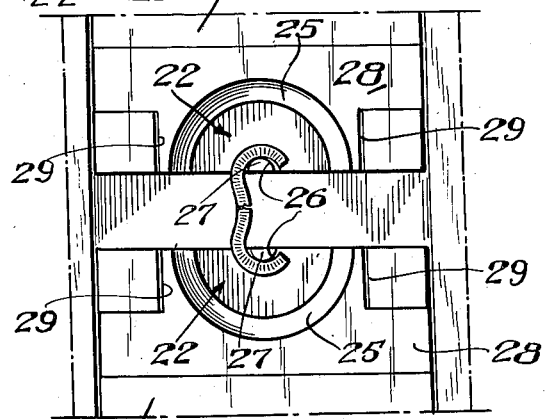
INVENTOR.
William H. Thornton
BY
Leonard L. Kalish
ATTORNEY.

Patented July 21, 1942

2,290,605

UNITED STATES PATENT OFFICE 2,290,605

LOCK-WASHER TESTING MACHINE

William H. Thornton, Philadelphia, Pa., assignor to George K. Garrett Co., Philadelphia, Pa., a corporation of Delaware Application March 18, 1940, Serial No. 324,536

6 Claims. (Cl. 265—12)

The present invention relates to a testing-machine for testing split lock-washers, and it relates more particularly to a washer-testing machine adapted to spread or elongate and then rupture the specimen split lock-washers under progressively-increasing measured loads, thereby to reveal the structural strength and other physical characteristics of the lock-washers.

An object of the present invention is to provide a durable lock-washer testing-machine of simple and compact construction, which may be produced at a relatively low cost, and which is simple to operate and efficient in use, and which requires minimum maintenance, and wherein the repairs, if any, which might ultimately be required after extended use, will be of only minor nature and may be quickly and easily effected at relatively small cost.

Another object of the present invention is to provide a lock-washer testing-machine having a wide range of applicability to lock-washers of various shapes and sizes, and one which may with minimum effort be readily adapted for testing lock-washers of widely varying shapes and sizes.

Another object of the present invention is to provide a lock-washer testing-machine wherein the specimen lock-washer undergoing test does not have to be compressively gripped or clamped in any vise-like arrangement prior to the application of the test load, and wherein the specimen washer requires no special preparation or shaping preliminary to its insertion into the machine; and wherein, on the contrary, the specimen lock-washer, in its ordinary and usual form, may be readily and easily operatively positioned in the testing-machine preliminary to subsequent application of load by merely dropping it onto a washer-receiving seat portion in the machine.

Another object of the present invention is to provide a lock-washer testing-machine having a wide range of usefulness and adapted to reveal various different physical properties and characteristics of the lock-washers under test.

Other objects will appear more fully from the following detailed description, accompanying drawings, and appended claims.

With the foregoing and other objects in view, the present invention in one of its forms may consist of a testing-machine for split lock-washers, including a pair of juxtaposed relatively movable metal blocks bearing opposed generally semi-circular chases or grooves on corresponding sides thereof, the ends of said chases or grooves being adapted for respective registration with each other when said blocks are brought together, to form a diametrically-split annular seat adapted to receive the specimen lock-washer to be tested, the metal portions encompassed by said chases or grooves extending upwardly into the central hole of said specimen lock-washer and comprising a split-core adapted to be separated to spread or expand said washer when the blocks are forcibly drawn apart, means connected with one of said blocks for forcibly moving it in a direction away from the other block, dynamometer means connected with the other of said blocks for indicating the magnitude of the force applied to the specimen lock-washer, and extensometer means operatively associated with said blocks for indicating their relative movements.

The present invention, in another one of its many phases, may further include means permitting ready removal and replacement of the groove-bearing portions of said blocks, whereby the testing-machine may be readily and easily adapted for testing lock-washers of any size or shape.

The invention further consists of other novel features and details of construction and arrangements of elements, all of which will appear more fully from the following detailed description and the accompanying drawings.

For the purpose of illustrating the invention, there is shown in the accompanying drawings a form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the accompanying drawings, wherein like reference characters indicate like parts, Figure 1 represents the plan view looking down on a horizontal testing-machine constituting one illustrative embodiment of the present invention.

Figure 2 represents a longitudinal sectional view through the testing-machine illustrated in Figure 1, as would be seen for example on section-line 2—2 of Figure 1, looking in the direction of the arrows.

Figure 3 represents an enlarged sectional view taken on line 3—3 of Figure 1, looking in the direction of the arrows.

Figure 4 represents an enlarged sectional view taken on line 4—4 of Figure 1, looking in the direction of the arrows.

Figure 5 represents an enlarged plan view of the dynamometer portion of the testing-machine illustrated in Figures 1 and 2, with parts being broken away to reveal underlying details of construction.

Figure 6 represents a sectional view taken on line 6—6 of Figure 5, looking in the direction of the arrows.

Figure 7 represents a perspective view of a pair of juxtaposed washer-engaging blocks which may be used in the testing-machine illustrated in the preceding figures in lieu of the removable washer-engaging blocks there shown, when it is desired to test larger-sized lock-washers.

Figures 8, 9, and 10 are fragmentary views showing three different lock-washers under test at the instant of fracture, and illustrate some of the different shapes and configurations which different lock-washers may possess when they are about to fracture.

The particular embodiment of the present invention selected for purposes of exemplification and illustrated in the accompanying drawings comprises a horizontal testing-machine wherein the lock-washer under test is subjected to spreading forces which act or extend in a generally horizontal plane. It is to be expressly understood however, that the testing-machine may, if desired, be so arranged and disposed that the lock-washer under test may be subjected to spreading forces acting or extending in a generally vertical plane.

The illustrated testing-machine includes a bed-plate 15, preferably of heavy metal possessing ample structural strength, as for example of cast or rolled steel or the like, and having a smooth upper surface on which may slidably rest a pair of juxtaposed relatively movable metal blocks 16 and 17. As more particularly illustrated in Figures 3 and 4, these blocks are slidably confined between a pair of spaced stationary guide-rails 18 of inverted L-shaped cross-section, whose upper portions 19 overhang the side edges of the slidable blocks 16 and 17, and extend into the notched-out portions 20 extending along the upper corners of these blocks. These guide-rails 18 may be firmly secured to the bed plate 15 in any suitable manner, as for example by means of screws 21, whose head portions may be recessed to lie flush with the top surface of the guide-rails. In this fashion, the inner sides of these opposed rails 18, in conjunction with the intermediate upper surface of the bed plate 15, compositely form the walls of a passageway of inverted T-shaped cross-section, and within this passageway are slidably disposed the blocks 16 and 17, whose cross-sectional outlines correspond with the walls of this T-shaped passageway.

The slidable blocks 16 and 17 may bear opposed generally semi-circular chases or grooves 22 on their upper surfaces, whose ends are adapted to register when the blocks are brought together, thereby to form a diametrically-split annular seat or trough in which may be placed the specimen lock-washer 23 to be tested.

The particular dimensions, the degree of curvature, and the cross-sectional shape of the chases or grooves 22 may vary widely, and are preferably selected with the dimensions and curvatures and cross-sectional shapes of the test-specimen lock-washers in mind. Thus, for example, the bottom wall or washer-receiving surface 24 of the groove 22 may be generally flat, and may be disposed at a sufficient depth below the surface of the block generally to accommodate the "free-height" of the highest split lock-washer 23 which is intended to be placed in said groove, that is to say the groove 22 may be sufficiently deep to permit the lock-washer having the maximum height dimension at its gap-zone (where the washer ends are sprung apart in a direction generally perpendicular to the plane of the washer) to be inserted into said groove generally without projecting upwardly therefrom.

The radially-outermost groove side-wall 25 may be inclined outwardly as indicated in Figure 3 to guide the lock-washer 23 onto its annular seat 24, or if desired the radially-outermost groove side-wall may extend straight up and down, as indicated in Figure 7. In any event the diameter at the base portion of this radially-outermost side-wall 25 is preferably slightly larger than the outside diameter of the largest-sized lock-washer which is intended to be placed on the seat 24.

The juxtaposed radially-innermost groove side-wall 26 preferably extends straight up and down, and is preferably struck along a radius sufficiently small to permit the lock-washer having the smallest inside diameter among those intended to be placed on the seat 24 to be readily slipped down over the upwardly-extending core-halves 27 when the latter have been brought together. In the preferred embodiment, the curved walls 26 of the core-halves 27 contact the innermost hole-defining wall of the lock-washer 23 in tangential fashion, with the curvature of the core-walls 26 being sufficiently sharper than the curvature of the juxtaposed washer wall to limit the zone of tangency. However, the curvatures of these walls are preferably so related that the zone of tangency is of sufficient area to keep the load per unit of area within reasonable bounds, so as to prevent the core-halves 27 from unduly nicking or cutting into the inner periphery of the lock-washer during the test. The relative hardness of the lock-washer metal also enters into the choice of the proper curvature for the core-walls 26.

In actual practice, I have found that a plurality of differently-sized lock-washers may be properly tested with a single core and groove arrangement, and that relatively few differently-sized core and groove arrangements, as for example three different core and groove arrangements, can accommodate the normal range of lock-washers varying in size from the relatively smaller ones to the relatively larger ones.

Although the grooves 22 may be formed directly in these slidable blocks 16 and 17, with the groove-bearing zones constituting integral portions of said blocks, in the preferred embodiment these grooves are formed in separate relatively smaller blocks 28 adapted to be readily detachably connected or engaged with the larger blocks 16 and 17. Thus, for example, these blocks 28 may be T-shaped as shown in Figure 1, and may be readily slipped into or extracted from corresponding socket-like T-shaped recesses 29 in the blocks 16 and 17. In this fashion, the groove-bearing blocks 28 may be readily operatively associated with the slidable blocks 16 and 17, and thereafter any movement of these slidable blocks will result in corresponding movement of the washer-engaging core-halves 27.

By virtue of the foregoing feature, a number of differently-sized groove-bearing sets of blocks may be provided for testing a corresponding number of different groups of washers, with the groove and core dimensions of each set of blocks being expressly selected for use in testing the associated group of washers. The changeover from one set of blocks to the other may be quickly and easily effected, requiring merely the extraction of one set of blocks 28 from the recesses 29, and the insertion of another set of blocks 30, as for example that shown in perspective in Figure 7, into the vacated recesses 29.

If desired the grooves 22 may be omitted, and instead the core-halves 27 may extend upwardly from the main upper surfaces of the blocks 28, or of the blocks 16 and 17 when removable blocks 28 are not included. With such construction, those portions of the upper surfaces of the blocks which surround the base portions of the core-halves 27 may function as an exposed washer-receiving seat, in lieu of the depressed bottom-wall 24 of the grooves 22 as formerly.

Any suitable means may be provided for relatively drawing the slidable blocks 16 and 17 apart and for simultaneously measuring the load applied to the test specimen lock-washer 23. Thus for example the block 16 may be slid along its ways by the rotation of a drive screw 31, which screw-threadedly engages an internally-threaded hole 32 in the block 16. This drive-screw 31 may be journaled in a cross-bar 33, which extends across the bed-plate 15 at the foot of the guide-rails 18 and is secured to said bed-plate by the screws 34. The drive-screw 31 may be fixed against axial movement in the cross-bar 33 by any suitable means, as for instance by a transverse locking-pin 35 having its side portion extending tangentially into an annular groove 36 formed in the surface of the drive-screw 31. The end portion of this drive-screw 31 may project beyond the cross-bar 33 and into the hub of a relatively large-diametered spur gear 37, to which it may be keyed by the inclined set-screw 38.

The gear 37 may mesh with a pinion gear 39 keyed to a pinion-shaft 40, which is journaled within a suitable hole in the cross-bar 33. This latter shaft 40 may be fixed against axial movement in said cross-bar by a transverse locking-pin 41, which may extend tangentially into an annular groove formed in the surface of said shaft. The pinion-shaft 40 may be rotated by any suitable power-driven means, or if desired, a hand crank-lever 42 may be mounted thereon for manual operation.

The rotation of the pinion-shaft 40 in the suitable direction causes the axially-fixed drive-screw 31 to thread itself farther into the slidable block 16, moving said block in a direction away from the juxtaposed slidable block 17. After all clearances have been taken up, the washer 23 which encircles the split-core 27 tends to pull the juxtaposed block 17 along with the moving screw-driven block 16, the pull transmitted by the specimen washer preferably being indicated by any suitable force-registering scale or balance or dynamometer means operatively associated with the slidable block 17. Thus for example in the embodiment illustrated in the accompanying drawings, a dial-type force-registering dynamometer 43, may be operatively connected with the slidable block 17, with the end portion of said dynamometer remote from said block being fixedly related to the bed-plate or frame of the testing-machine or if desired any other suitable dynamometer may be employed.

The dynamometer 43 includes a continuous spring member 44 whose juxtaposed long sides are outwardly oppositely-bowed in oval-shaped or elliptical fashion when relaxed. When the ends of the spring member lying on its major axis are pulled or forced apart, these juxtaposed long sides tend to flatten themselves out or relatively to approach each other, and when the pull is released these long sides spring back to their original bowed condition. This causes variation in the length of the minor axis of the spring member 44, that is to say it causes relative approach and separational movement of these long sides of the spring member, the extent of which is proportional to the magnitude of the force with which the end loops of the spring member are pulled apart, and by measuring the former, the magnitude of the latter may be arrived at.

Thus, referring more particularly to Figures 5 and 6, the variations in the length of the minor axis of spring member 44 is converted into rotary movement of a dial pointer 45 by means of a slidable plunger-rod 46, whose outer end portion may abut directly or indirectly against the inside center portion of a long side of the spring member 44, and whose opposite innner end portion extends into a casing 47 which houses suitable mechanism for transforming sliding movement of the plunger-rod 46 into rotary movement of the pointer-shaft on which the pointer 45 is mounted. A dial 48 mounted below the pointer 45 is marginally graduated in pounds, and by merely reading the particular graduation opposite the end of the pointer in any of its positions, one is advised of the magnitude of the tensile force being exerted at that instant at the ends of the spring member 44, which is the same as the load applied to or transmitted by the specimen lock-washer 23.

In order to "hold" the maximum reading of the live pointer 45, which might otherwise be lost by reason of said pointer springing back to its original zero position when the specimen washer fractures under test and releases the pull on the dynamometer, a second idle pointer 49 may be provided under this live pointer 45. This idle pointer 49 is mounted on a shaft concentric with the shaft for the pointer 45, but rotatable independently thereof, and held by only sufficient friction to insure immobility of the idle pointer 49 when the latter is not being driven. A pin 50 carried by the live pointer 45 extends downwardly sufficiently to enter and engage the innermost end of a groove in the underlying idle pointer 49, said groove beginning at the trailing edge of the idle pointer and extending part way thereacross. In this fashion, when the pull on the dynamometer is increased, the live pointer 45 will move in a clockwise direction carrying with it the underlying idle pointer 49, and when the pull on the dynamometer is released, or decreased, the live pointer 45 will return in a counter-clockwise direction, leaving the idle pointer 49 at its point of maximum travel to indicate the maximum load which had been applied. The idle pointer 49 may then be manually reset to the zero position for further use.

The end loop portion of the dynamometer spring member 44 nearest the slidable block 17 may extend into a groove or recess 51 in said block, and may be anchored or locked therein by means of an anchorage pin 52 which bridges the recess and extends through the end loop portion of the spring member. Similarly, the opposite end loop portion of the spring member 44 may be secured relative to the frame or bed-plate of the testing-machine by extending into a recess 53 formed in an anchorage member 54, which may be fixedly secured near an end of the bed-plate 15 by screws 55 or by any other suitable means, and with said end loop of the spring member being locked within said recess by a pin 56 which bridges said recess and extends through said end loop.

Extensometer means may be provided for indicating the elongation or stretch in the specimen lock-washer under test at any given instant. As indicated more particularly in Figures 1 to 4 inclusive, the illustrated extensometer means may include a pair of bent rods 57 and 58 secured to the upper surfaces of the slidable blocks 16 and 17 by the screws 59. Rod 57 which is secured to the slidable block 16 may have its end portion 60 turned upwardly, and to this upturned end portion may be fixedly secured a dial-type gauge 61 having a scale graduated in thousandths of an inch. A slidable pointer-actuating plunger-rod 62 may extend diametrically through the gauge casing, and inside this casing may be disposed suitable mechanism for converting axial movement of this plunger-rod 62 into rotary movement of the dial-pointer 63. Adjustment of the graduated scale relative to the pointer 63 may be readily effected by loosening a set-screw 64 and then manually rotating the bezel ring 65, which is fixedly related to said graduated scale, into any desired new setting.

The other rod 58 may extend part way over the guide-rail 18, and then may extend upwardly for a short distance as at 66, and then may extend horizontally for a substantial distance as at 67, crossing over the lower bar 58. The extreme end portion 68 of rod 58 may be bent upwardly at a point beyond the end of the plunger-rod 62, and may bear an internally-threaded opening in axial alignment with the plunger-rod 62, through which opening may extend a manually-adjustable abutment-screw 69, whose forward end is adapted to bear against the juxtaposed end of the pointer-actuating plunger-rod 62.

By virtue of the foregoing construction, separational movement of the sliding blocks 16 and 17 will be accommodated by a corresponding approach of the abutment-screw 69 (associated with the slidable block 17) relative to the gauge 61 (associated with the slidable block 16), causing the pointer-actuating plunger-rod 62 to be thrust farther into the gauge casing, thereby rotating the dial-pointer 63 by an equivalent amount. The amount by which the specimen lock-washer under test has been stretched or elongated by virtue of the separational movement of the core-halves 27 may then be read directly in thousandths of an inch by simply noting the position of the dial-pointer 43 relative to the graduated scale. If desired, other means may be provided for quantitatively indicating the elongation of the specimen lock-washer, in lieu of the specific extensometer means hereinabove described.

In actual operation, assuming the washer-engaging blocks 28 to be operatively positioned within their respective recesses 29 in the initially-adjacent sliding blocks 16 and 17, the specimen lock-washer 23 is merely dropped down over the juxtaposed upwardly-extending core-halves 27 onto the washer-receiving seat, with the gap of the lock-washer being disposed generally over the dividing zone between the blocks 28. The crank-lever 42 is then rotated in whatever direction may be necessary relatively to separate the sliding blocks 16 and 17. As soon as all clearances have been taken up, the active dynamometer pointer 45 will start to register the applied load. At this instant, the adjustable abutment-screw 69 of the extensometer arrangement may be manually set so that its forward end just touches the juxtaposed end of the pointer-actuating plunger-rod 62, at which instant the dial-pointer 63 should read zero. The crank-lever 42 is then further rotated in the same direction as formerly, thereby gradually increasing the tensile load applied to the specimen lock-washer. This increasing applied load will be progressively indicated on the dynamometer dial 48 by the moving pointer 45, and simultaneously therewith the elongation or stretch or deformatiin of the specimen lock-washer in a longitudinal direction will be progressively indicated on the extensometer dial 61 by the moving pointer 63. This may be continued until the specimen lock-washer fractures or ruptures, at which instant the pull exerted on the dynamometer spring member 44 suddenly ceases, thereby causing the pointer 45 to spring back to zero, leaving the frictionally-held idle pointer 49 at the maximum load reading.

The machine will be subjected to minimum shock when fracture occurs, due to its hereinabove described construction, thus affording an important advantage. The section of failure usually will occur at a point along the lock-washer diametrically opposite its gap, as more particularly indicated in Figures 8, 9, and 10. The springiness and toughness of the washer may be noted at the instant fracture occurs, and the suddenness with which fracture occurs may also be noted. The fractured ends may then be examined for the character of grain structure, and the cross-sectional shape at the point of fracture may also be observed. The particular overall shape or outline of the washer at the instant of fracture may also be studied to determine whether the specimen washer is acceptable or not. Three illustrative shapes which specimen lock-washers may possess at the instant of fracture have been illustrated in Figures 8, 9 and 10 respectively.

Any desired standards may be set for determining the acceptability or non-acceptability of the lock-washers of any given material and of any given size. Thus, for example, in order for lock-washers of any given size and material to be acceptable, they might have to withstand a maximum load of any given number of pounds without fracturing, and possibly without exceeding a given permissible deformation. If desired, any suitable load may be applied to the specimen lock-washer, and then released by counter-rotation of the crank-lever 42, and the extensometer reading at the instant the backwardly-moving dynamometer-pointer 45 reaches zero may be noted. This extensometer reading will indicate the permanent "set" in the specimen lock-washer caused by the applied load. Other standards for the lock-washers may be set, as for example deformation limits for any given load and/or for the maximum load.

It will be seen that the acceptability or non-acceptability of lock-washers in the light of these and other possible standards may be readily accurately determined by means of the hereinabove-described testing-machine.

By means of the foregoing testing-machine, one may quickly and easily test in rapid succession any given number of lock-washers of the same or of different sizes. The lock-washer undergoing test does not have to be compressively gripped or clamped in any vise-like arrangement, and need only be slipped over the juxtaposed core-halves 27 preparatory to the application of load. The machine is simple and compact, and is of extremely durable construction. It may be produced at low-cost, and may be readily inexpensively repaired when necessary, with a minimum amount of effort and with minimum delay.

The present invention may be embodied in other specific forms without departing from the spirit or essential attributes thereof, and it is therefore desired that the present embodiments be considered in all respects as illustrative and not restrictive, reference being had to the appended claims rather than the foregoing description to indicate the scope of the invention.

Having thus described the invention what is hereby claimed as new and desired to be secured by Letters Patent, is:

1. A machine for testing split lock-washers, including a pair of relatively movable blocks each bearing a socket-like recess, a juxtaposed pair of relatively smaller blocks detachably connected with the first-mentioned pair of blocks by portions extending into said recesses, said relatively smaller blocks each bearing a generally-semi-circular groove on a corresponding side thereof arranged compositely to form a generally annular washer-receiving trough in which the specimen washer to be tested is adapted to be seated when said groove-bearing blocks are in adjacent relation, the inner periphery of said semi-circular grooves having a smaller radius of curvature than the radius of curvature of the lock-washers under test, means for forcibly moving one of said movable blocks in a direction away from the other one of said movable blocks, and dynamometer means operatively associated with said other one of said relatively movable blocks for indicating the load applied to the specimen lock-washer undergoing test.

2. A machine for testing split lock-washers, including a pair of relatively movable blocks each bearing a generally semi-circular groove on a corresponding side thereof arranged compositely to form a generally annular trough adapted to receive the specimen washer to be tested when said blocks are in adjacent relation, the inner periphery of said semi-circular grooves having a smaller radius of curvature than the radius of curvature of the lock-washers under test, means for forcibly moving one of said blocks in a direction away from the other one of said blocks, and dynamometer means operatively associated with said other one of said blocks for indicating the load applied to the specimen lock-washer undergoing test.

3. A machine for testing split lock-washers, including a pair of relatively movable blocks each bearing a socket-like recess, a juxtaposed pair of relatively smaller blocks detachably connected with the first-mentioned pair of blocks by portions extending into said recesses, said relatively smaller blocks each bearing an integral portion adapted to extend into the central hole of the specimen washer to be tested, said integral portions when brought together compositely forming a split core over which said washer may be placed, said split core having a smaller radius of curvature than that of the lock-washer under test, means for forcibly moving one of said movable blocks in a direction away from the other one of said movable blocks, and dynamometer means operatively associated with said other one of said movable blocks for indicating the load applied to the specimen lock-washer undergoing test.

4. A machine for testing split lock-washers, including a pair of relatively movable blocks each bearing an integral part adapted to extend into the central hole of the specimen washer to be tested, said integral portions when brought together compositely forming a split core over which said washer may be placed, said split core having a smaller radius of curvature than that of the lock-washer under test, means for forcibly moving one of said blocks in a direction away from the other one of said blocks, and dynamometer means operatively associated with the said other one of said blocks for indicating the load applied to the specimen lock-washer undergoing test.

5. In a washer-testing machine of the character described having a pair of juxtaposed relatively movable members each bearing an anchorage recess, a pair of blocks detachably associated with said members each of said blocks including an anchorage portion adapted for ready insertion into or withdrawal from said anchorage recesses, and each of said blocks further including an integral portion adapted to extend into the central hole of the specimen washer to be tested, said integral portions when brought together compositely forming a split core over which said washer may be placed, said split core having a smaller radius of curvature than that of the lock-washer under test, and means for forcibly relatively separating said movable members thereby to cause said split core portions to separate and expand said washer.

6. In a lock-washer testing-machine of the character described having a pair of movable blocks and having means for gradually moving said blocks away from each other, semi-cylindrical members carried by said blocks and adapted to meet and to form an axially-split cylindrical member when said movable blocks are in their positions closest to each other, said axially-split cylindrical member being adapted to receive a lock-washer to be tested and having a smaller radius of curvature than that of said lock-washer, said semi-cylindrical members being adapted tangentially to contact said lock-washer at relatively small diametrically-opposed points thereof when said movable members are moved away from each other thereby to distort said lock-washer by diametrically-opposed radially-outward force applied in the radial plane of said lock-washer.

WILLIAM H. THORNTON.